United States Patent
Kosugi

(10) Patent No.: US 12,125,311 B2
(45) Date of Patent: Oct. 22, 2024

(54) ELECTRONIC APPARATUS AND CONTROL METHOD

(71) Applicant: Lenovo (Singapore) Pte. Ltd., Singapore (SG)

(72) Inventor: Kazuhiro Kosugi, Kanagawa (JP)

(73) Assignee: Lenovo (Singapore) Pte. Ltd., Singapore (SG)

( * ) Notice: Subject to any disclaimer, the term of this patent is extended or adjusted under 35 U.S.C. 154(b) by 358 days.

(21) Appl. No.: 17/696,325

(22) Filed: Mar. 16, 2022

(65) Prior Publication Data

US 2022/0366721 A1 Nov. 17, 2022

(30) Foreign Application Priority Data

May 12, 2021 (JP) ................................ 2021-080886

(51) Int. Cl.
*G06V 40/16* (2022.01)
*G06V 10/75* (2022.01)
*G06V 40/20* (2022.01)

(52) U.S. Cl.
CPC ............ *G06V 40/161* (2022.01); *G06V 10/75* (2022.01); *G06V 40/20* (2022.01)

(58) Field of Classification Search
CPC ...... G06V 40/161; G06V 10/75; G06V 40/20; G06V 40/40; G06V 40/176
USPC ....................................................... 382/103
See application file for complete search history.

(56) References Cited

U.S. PATENT DOCUMENTS

| | | | |
|---|---|---|---|
| 2005/0198661 A1* | 9/2005 | Collins | G09F 27/00 725/19 |
| 2017/0004354 A1* | 1/2017 | Noridomi | G06V 40/166 |
| 2020/0327315 A1* | 10/2020 | Mullins | G06V 40/103 |
| 2021/0264621 A1* | 8/2021 | Rao | G06V 40/50 |
| 2021/0286978 A1* | 9/2021 | Kamio | G06V 40/161 |

FOREIGN PATENT DOCUMENTS

| | | | |
|---|---|---|---|
| JP | 2008-305400 A | 12/2008 | |
| JP | 2016-148895 A | 8/2016 | |
| JP | 2018-160799 A | 10/2018 | |
| JP | 2020-184177 A | 11/2020 | |
| KR | 20170039518 | * 4/2017 | ............ G06F 21/32 |
| KR | 20200057099 | * 5/2020 | ........... G06V 40/168 |
| WO | 2015/098110 A1 | 7/2015 | |

* cited by examiner

*Primary Examiner* — Jerome Grant, II
(74) *Attorney, Agent, or Firm* — Osha Bergman Watanabe & Burton LLP

(57) ABSTRACT

An electronic apparatus includes a memory which temporarily stores image data of an image captured by an imaging device, and a processor which processes image data stored in the memory. The processor: processes image data of plural images captured by the imaging device at predetermined time intervals and stored in the memory to detect face areas with a face captured therein from among the plural images; determines the amount of change in face area position detected from among the plural images, and determines whether or not there is motion in the captured face over the predetermined time intervals based on the amount of change; and determines that a user is present when it is determined that there is motion in the face.

9 Claims, 11 Drawing Sheets

ELECTRONIC APPARATUS AND CONTROL METHOD

CROSS-REFERENCE TO RELATED APPLICATIONS

This application claims priority to Japanese Patent Application No. JP2021-80886 filed May 12, 2021, the contents of which are hereby incorporated herein by reference in their entirety.

TECHNICAL FIELD

The present invention relates to an electronic apparatus and a control method.

BACKGROUND

There is an electronic apparatus which makes a transition to a usable state when a person approaches or to a standby state in which functions except some of the functions are stopped when the person leaves. For example, in Japanese Unexamined Patent Application Publication No. 2016-148895, an infrared sensor is used to detect whether a person is approaching or a person goes away.

In recent years, with the development of computer vision and the like, detection accuracy when detecting a face from an image has been getting higher. Therefore, face detection is beginning to be used instead of person detection using the infrared sensor. When using the infrared sensor, infrared light is reflected on and returned from a target regardless of whether the target is a person or any object other than the person, but use of face detection can prevent just an object from being detected as a person by mistake.

SUMMARY

However, even when using face detection, there is a possibility that a person using an electronic apparatus may be erroneously detected even though not being present by detecting a face in a photo or a poster of a person.

The present invention has been made in view of the above circumstances, and it is an object thereof to provide an electronic apparatus and a control method for detecting a person using the electronic apparatus accurately.

The present invention has been made to solve the above problem, and an electronic apparatus according to the first aspect of the present invention includes a memory which temporarily stores image data of an image captured by an imaging device, and a processor which processes image data stored in the memory, wherein the processor includes: a face detection unit which processes image data of plural images captured by the imaging device at predetermined time intervals and stored in the memory to detect face areas with a face captured therein from among the plural images; a motion determination unit which calculates the amount of change in face area position detected from among the plural images, and determines whether or not there is motion in the captured face over the predetermined time intervals based on the amount of change; and a person determination unit which determines that a user is present when it is determined by the motion determination unit that there is motion in the face.

In the above electronic apparatus, when it is determined by the motion determination unit that there is no motion in the captured image, the person determination unit may determine that the face is not a face of the user, and determine that the user is not present.

In the above electronic apparatus, the motion determination unit may register an area of the face determined by the motion determination unit that there is no motion among faces detected respectively from the images, and exclude the registered area from determination targets after that.

The above electronic apparatus may further include a sensor which detects movement of the electronic apparatus, wherein when it is detected that the electronic apparatus has been moved by using the sensor, the motion determination unit returns the registered area to a determination target.

The above electronic apparatus may also be such that the image data includes first-resolution image data, the face detection unit processes the first-resolution image data and executes a low-resolution mode to detect the face areas, and the motion determination unit determines whether or not there is motion in the face based on the face areas detected by the face detection unit in the low-resolution mode.

The above electronic apparatus may further be such that the image data includes second-resolution image data higher in resolution than the first resolution image data, when it is determined by the motion determination unit that there is no motion in the face detected by processing the first resolution image data, the face detection unit processes the second resolution image data and executes a high-resolution mode to detect face areas, and the motion determination unit determines whether or not there is motion in the face based on the face areas detected by the face detection unit in the high-resolution mode.

The above electronic apparatus may further be such that, when the face areas are no longer detected in the high-resolution mode, the face detection unit executes detection of face areas in the low-resolution mode.

The above electronic apparatus may further include: a processing unit which executes system processing based on a system; and an operation control unit which causes an operating state of the system to make a transition to an operating state in which at least part of the system processing is limited when the electronic apparatus makes a transition from a state in which it is determined by the person determination unit that the user is present to a state in which it is determined that the user is not present.

Further, a control method for an electronic apparatus according to the second aspect of the present invention, where the electronic apparatus includes a memory which temporarily stores image data of an image captured by an imaging device, and a processor which processes image data stored in the memory, includes: a step of causing a face detection unit in the processor to process image data of plural images captured by the imaging device at predetermined time intervals and stored in the memory, and detect face areas with a face captured therein from among the plural images; a step of causing a motion determination unit in the processor to calculate the amount of change in face area position detected from among the plural images, and determine whether or not there is motion in the captured face over the predetermined time intervals based on the amount of change; and a step of causing a person determination unit in the processor to determine that a user is present when it is determined by the motion determination unit that there is motion in the face.

The above-described aspects of the present invention can detect a person using the electronic apparatus accurately.

BRIEF DESCRIPTION

DETAILED DESCRIPTION

Embodiments of the present invention will be described below with reference to the accompanying drawings.

First Embodiment

[Outline]

First, the outline of an electronic apparatus 1 according to a first embodiment will be described. The electronic apparatus 1 according to the present embodiment is, for example, a laptop PC (Personal Computer). Note that the electronic apparatus 1 may also be an electronic apparatus of any other form, such as a desktop PC, a tablet terminal device, or a smartphone.

The electronic apparatus 1 can make a transition at least between a normal operating state (power-on state) and a standby state as system operating states. The normal operating state is an operating state capable of executing processing without being particularly limited, which corresponds, for example, to S0 state defined in the ACPI (Advanced Configuration and Power Interface) specification. The standby state is a state in which at least part of system processing is limited. For example, the standby state may be the standby state or a sleep state, or a state corresponding to modern standby in Windows (registered trademark) or S3 state (sleep state) defined in the ACPI specification. For example, the standby state is an operating state lower in power consumption than the normal operating state.

In the following, a transition of the system operating state from the standby state to the normal operating state may also be called "boot." In the standby state, since the activation level is generally lower than the normal operating state, the boot of the system of the electronic apparatus 1 leads to the activation of the operation of the system in the electronic apparatus 1.

Figure 1A:
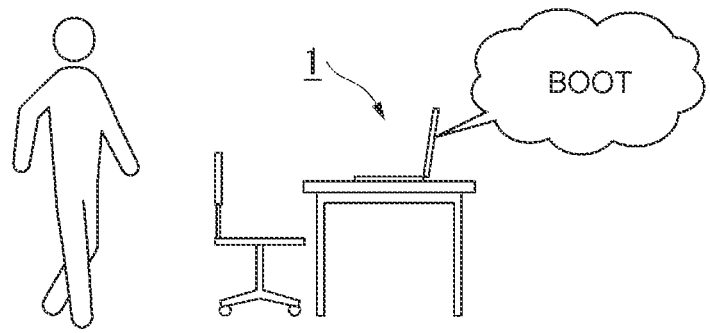
FIGS. 1A to 1C are diagrams for describing an outline of HPD processing of an electronic apparatus according to a first embodiment.
Figure 1B:
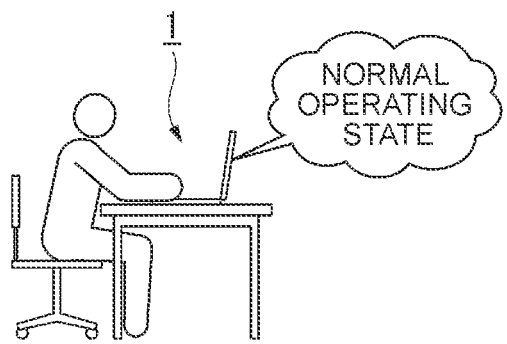
Figure 1C:
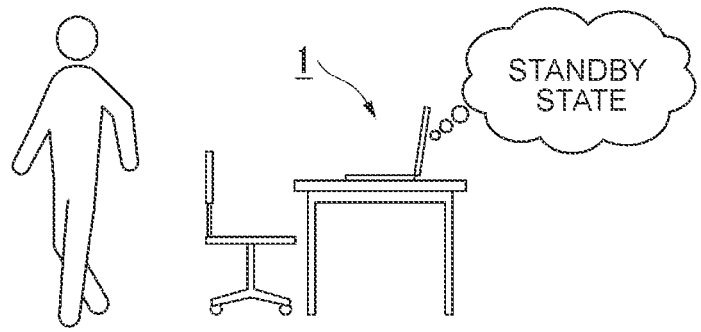

FIGS. 1A to 1C are diagrams for describing an outline of HPD processing of the electronic apparatus 1 according to the present embodiment. The electronic apparatus 1 detects a person (i.e., a user) present in the neighborhood of the electronic apparatus 1. This processing for detecting the presence of a person is called HPD (Human Presence Detection) processing. The electronic apparatus 1 detects the presence or absence of a person by the HPD processing to control the operating state of the system of the electronic apparatus 1 based on the detection result. For example, as illustrated in FIG. 1A, when detecting a change from a state where no person is present in front of the electronic apparatus 1 (Absence) to a state where a person is present (Presence), that is, when detecting that a person has approached the electronic apparatus 1 (Approach), the electronic apparatus 1 determines that a user has approached and automatically boots the system to make a transition to the normal operating state. Further, in a state where a person is present in front of the electronic apparatus 1 (Presence) as illustrated in FIG. 1B, the electronic apparatus 1 determines that the user is present and continues the normal operating state. Then, as illustrated in FIG. 1C, when detecting a change from the state where the person is present in front of the electronic apparatus 1 (Presence) to a state where no person is present (Absence), that is, when detecting that the person has left the electronic apparatus 1 (Leave), the electronic apparatus 1 determines that the user has left and causes the system to make the transition to the standby state.

For example, the electronic apparatus 1 detects a face area with a face captured therein from a captured image obtained by capturing the front side to determine whether or not the user is present in front of the electronic apparatus 1. When the face area is detected from the captured image, the electronic apparatus 1 determines that the user is present. On the other hand, when no face area is detected from the captured image, the electronic apparatus 1 determines that the user is absent. Here, a usage situation is assumed where there is a photo or a poster of a person behind the user when the user is using the electronic apparatus 1. In this usage situation, when the electronic apparatus 1 captures an image of the front side, a captured image as illustrated in FIG. 2 is obtained.

Figure 2:
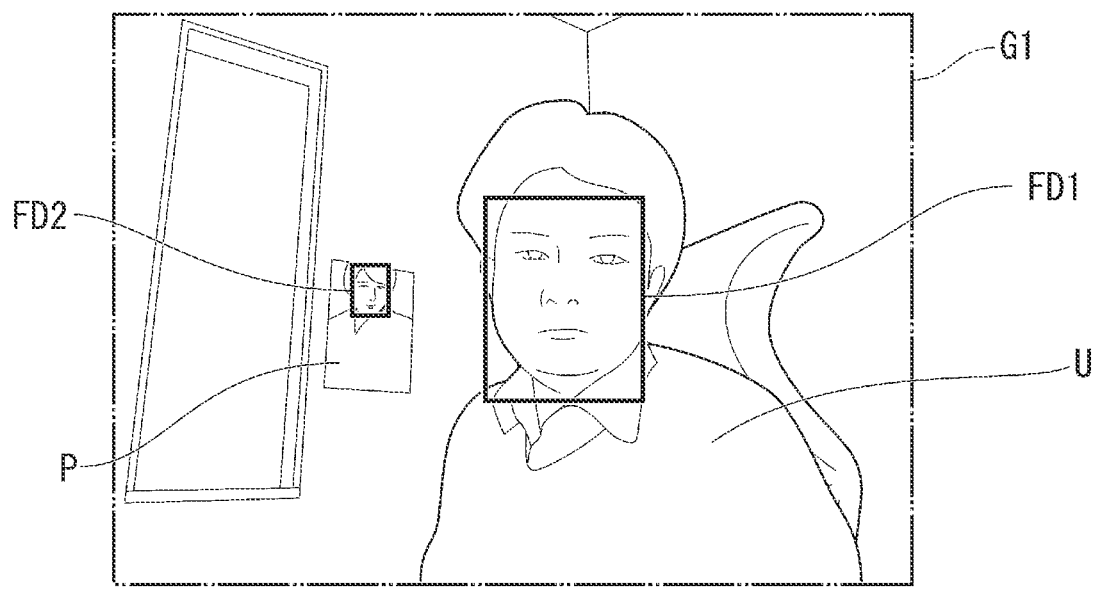
FIG. 2 is a diagram illustrating an example of a captured image.

FIG. 2 is a diagram illustrating an example of the captured image. A captured image G1 illustrated includes an image of user U present in front of the electronic apparatus 1 and an image of a poster P with a person therein. The electronic apparatus 1 detects two face areas of a face of the user U and a face of the poster P from the captured image G1. A detection area FD1 indicates the face area of the user U detected from the captured image G1. Further, a detection area FD2 indicates the face area of the poster P detected from the captured image G1. Since the detection area FD1 is larger than the detection area FD2, the electronic apparatus 1 detects the face of the user U as the face of a first person (the face of a main person), and determines that the person (i.e., the user) is present. Here, it is assumed that the electronic apparatus 1 detects the face of the poster P as the face of a second person (i.e., the face of any person other than the user). In this case, the electronic apparatus 1 erroneously detects that any other person is present despite being the face of the poster P. For example, when the electronic apparatus 1 has a function (Shoulder surfing) to detect the presence of any other person who is looking from behind the user, there is a possibility of erroneous detection that any other person who is looking from behind the user is present by detecting the face of the poster P.

Figure 3:
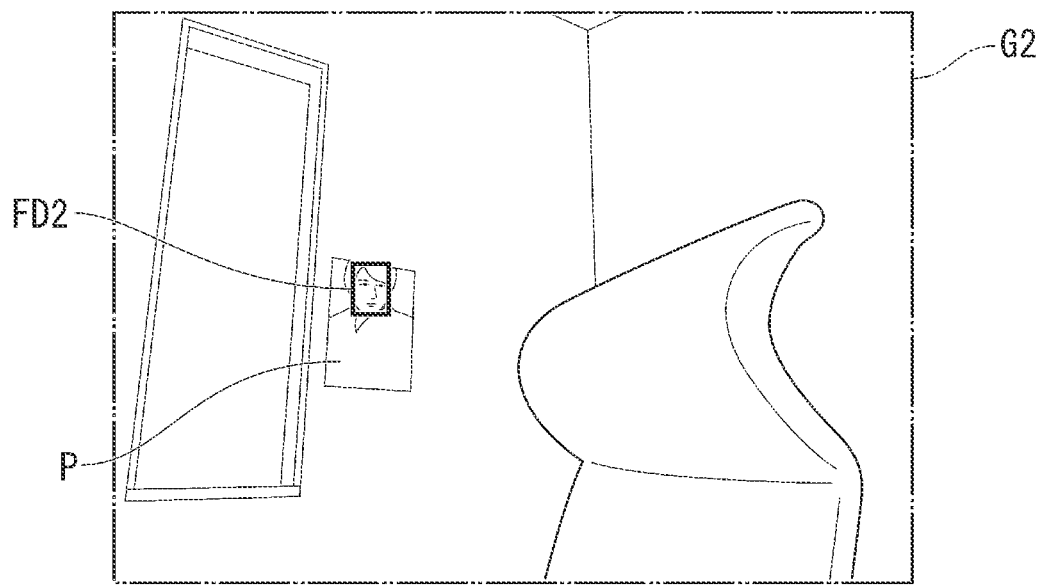
FIG. 3 is a diagram illustrating another example of the captured image.

FIG. 3 is a diagram illustrating another example of the captured image. A captured image G2 illustrated is an example of a captured image obtained in a situation where the user U is gone (has left) from the situation of the captured image G1 illustrated in FIG. 2. In this example, the electronic apparatus 1 detects only the face of the poster P from the captured image G2. In this case, there is a possibility that the electronic apparatus 1 erroneously detects that a person is present (i.e., that the user is present) despite being the face of the poster P.

Therefore, the electronic apparatus 1 according to the present embodiment determines whether or not there is motion in the face detected from the captured image to determine whether it is the face of the poster P or the face of the user U.

Figure 4:
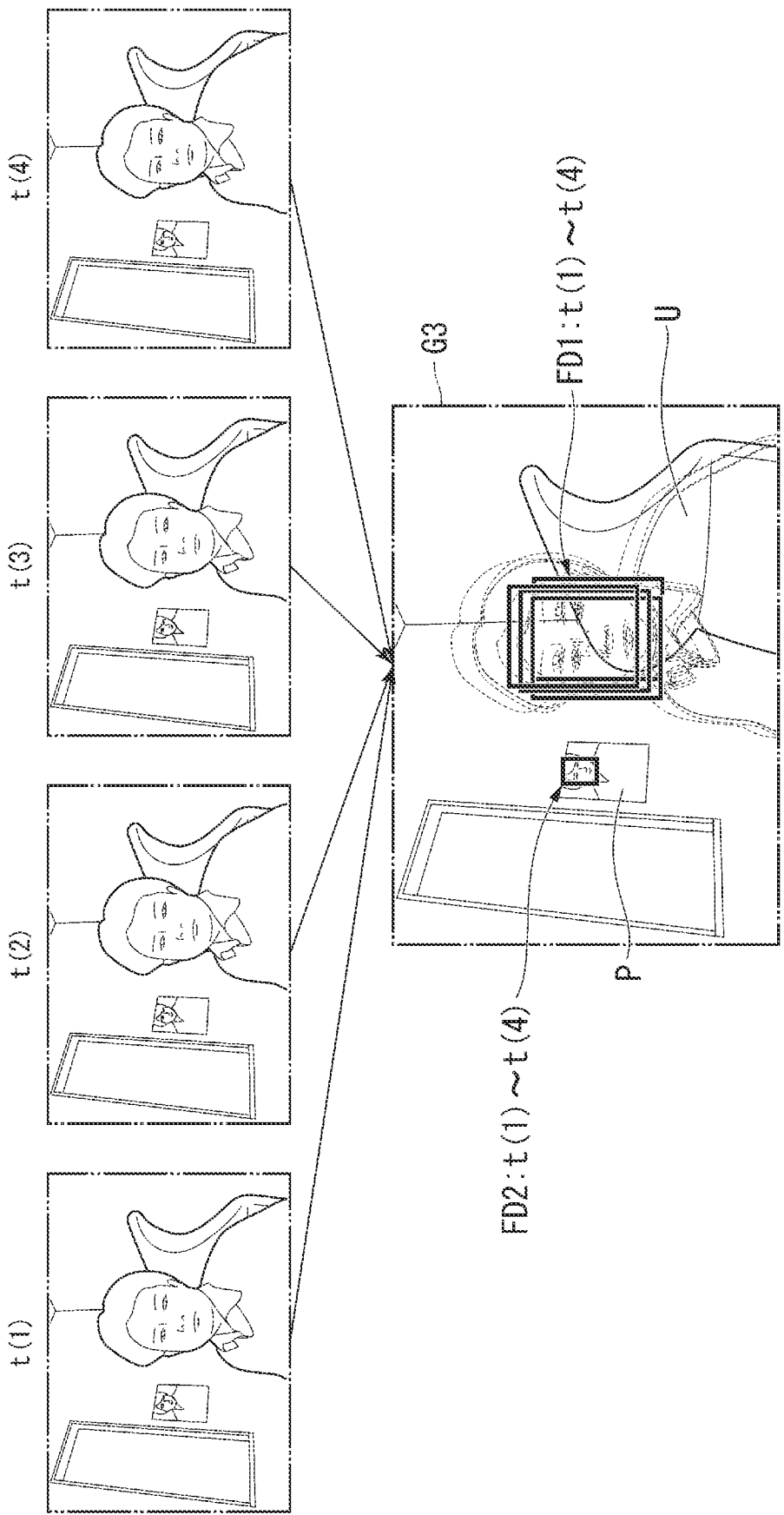
FIG. 4 is a diagram illustrating a comparison between the presence or absence of motion of a face.

FIG. 4 is a diagram illustrating a comparison between the presence or absence of the motion of each face. In FIG. 4, face areas detected from respective captured images at time t(1), time t(2), time t(3) and time t(4) are illustrated in an image G3. The respective captured images at time t(1), time t(2), time t(3) and time t(4) are images captured by the imaging unit 120 at predetermined time intervals (for example, 15 second intervals, 10 second intervals, or the like). As illustrated in the image G3, such a state that the user U completely stands still rarely continues. Therefore, there are differences among respective detection areas FD1 of the face of the user U at time t(1), time t(2), time t(3) and time t(4). On the other hand, since the poster P is completely stationary, respective detection areas FD2 of the face of the poster P at time t(1), time t(2), time t(3), and time t(4) coincide with one another. The electronic apparatus 1 determines that the user U is present when there is motion in the face detected from the captured images. On the other hand, when there is no motion in the face detected from the captured images, the electronic apparatus 1 regards the face as the face of a person in a photo or a poster, and determines that the user U is not present. Thus, a person (i.e., the user) using the electronic apparatus 1 can be detected more accurately.

Next, the configuration of the electronic apparatus 1 according to the present embodiment will be described in detail.

[Appearance Configuration of Electronic Apparatus]

Figure 5:
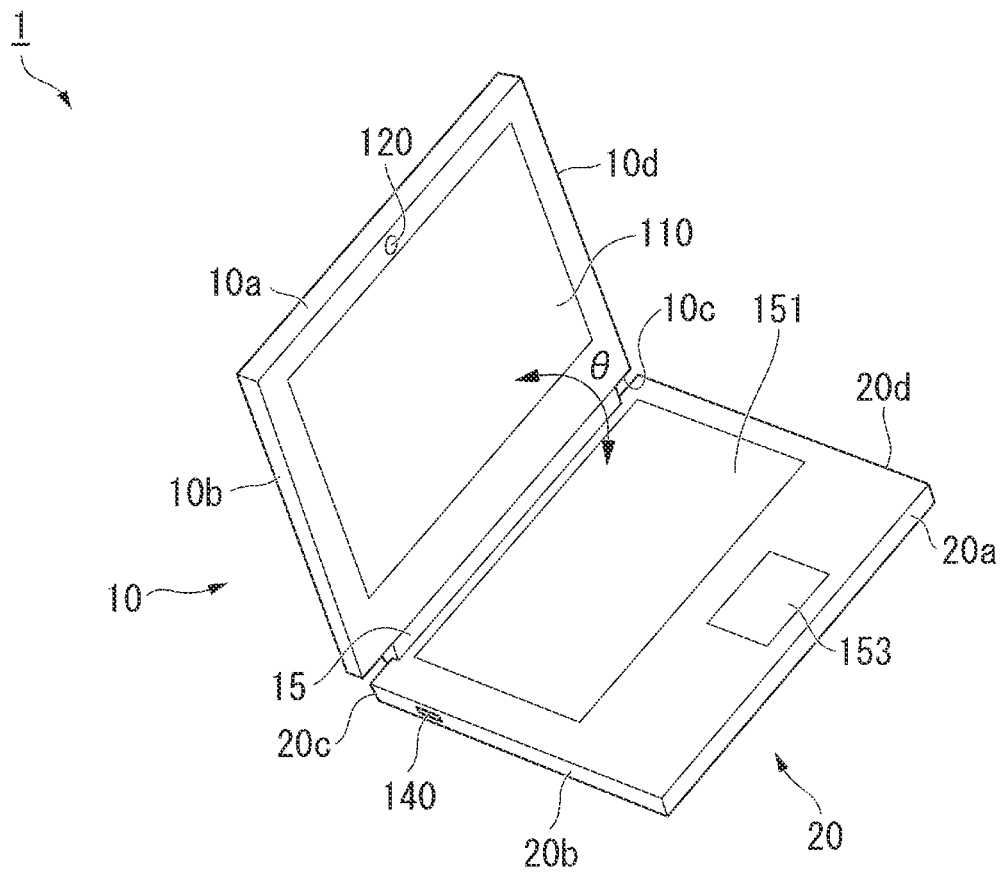
FIG. 5 is a perspective view illustrating an appearance configuration example of the electronic apparatus according to the first embodiment.

FIG. 5 is a perspective view illustrating an appearance configuration example of the electronic apparatus 1 according to the present embodiment.

The electronic apparatus 1 includes a first chassis 10, a second chassis 20, and a hinge mechanism 15. The first chassis 10 and the second chassis 20 are coupled by using the hinge mechanism 15. The first chassis 10 is rotatable around an axis of rotation formed by the hinge mechanism 15 relative to the second chassis 20. An open angle by the rotation between the first chassis 10 and the second chassis 20 is denoted by "θ."

The first chassis 10 is also called A cover or a display chassis. The second chassis 20 is also called C cover or a system chassis. In the following description, side faces on which the hinge mechanism 15 is provided among side faces of the first chassis 10 and the second chassis 20 are referred to as the side faces 10c and 20c, respectively. Among the side faces of the first chassis 10 and the second chassis 20, faces opposite to the side faces 10c and 20c are referred to as side faces 10a and 20a, respectively. In this figure, the direction from the side face 20a toward the side face 20c is referred to as "rear," and the direction from the side face 20c to the side face 20a is referred to as "front." The right hand and left hand in the rearward direction are referred to as "right" and "left," respectively. Left side faces of the first chassis 10 and the second chassis 20 are referred to as side faces 10b and 20b, respectively, and right side faces thereof are referred to as side faces 10d and 20d, respectively. Further, a state where the first chassis 10 and the second chassis 20 overlap each other and are completely closed (a state of open angle θ=0°) is referred to as a "closed state." The faces of the first chassis 10 and the second chassis 20 on the face-to-face sides in the closed state are referred to as respective "inner faces," and the faces opposite to the inner faces are referred to as "outer faces." Further, a state opposite to the closed state, where the first chassis 10 and the second chassis 20 are open, is referred to as an "open state."

The appearance of the electronic apparatus 1 in FIG. 5 illustrates an example of the open state. The open state is a state where the side face 10a of the first chassis 10 and the side face 20a of the second chassis 20 are separated. In the open state, the respective inner faces of the first chassis 10 and the second chassis 20 appear. The open state is one of states when the user uses the electronic apparatus 1, and the electronic apparatus 1 is often used in a state where the open angle is typically about θ=100° to 130°. Note that the range of open angles θ to be the open state can be set arbitrarily according to the range of angles rotatable by the hinge mechanism 15 or the like.

A display unit 110 is provided on the inner face of the first chassis 10. The display unit 110 is configured to include a liquid crystal display (LCD) or an organic EL (Electro Luminescence) display, and the like. Further, an imaging unit 120 is provided in a peripheral area of the display unit 110 on the inner face of the first chassis 10. For example, the imaging unit 120 is arranged on the side of the side face 10a in the peripheral area of the display unit 110. Note that the position at which the imaging unit 120 is arranged is just an example, and it may be elsewhere as long as the imaging unit 120 can face a direction (frontward) to face the inner face of the first chassis 10.

In the open state, the imaging unit 120 captures a predetermined imaging range in the direction (frontward) to face the inner face of the first chassis 10. The predetermined imaging range is a range of angles of view defined by an image sensor included in the imaging unit 120 and an optical lens provided in front of the imaging surface of the image sensor. For example, the imaging unit 120 can capture images including a person present in front of the electronic apparatus 1.

Further, a power button 140 is provided on the side face 20b of the second chassis 20. The power button 140 is an operating element used by the user to give instructions to boot the system (a transition from the standby state to the normal operating state) and to make a transition from the normal operating state to the standby state. Further, a keyboard 151 and a touch pad 153 are provided as an input device on the inner face of the second chassis 20. Note that a touch sensor may also be included as the input device instead of or in addition to the keyboard 151 and the touch pad 153, or a mouse and an external keyboard may be connected. When the touch sensor is provided, an area corresponding to the display surface of the display unit 110 may be constructed as a touch panel for accepting operations. Further, a microphone used to input voice may be included in the input device.

In the closed state where the first chassis 10 and the second chassis 20 are closed, the display unit 110 and the imaging unit 120 provided on the inner face of the first chassis 10, and the keyboard 151 and the touch pad 153 provided on the inner face of the second chassis 20 are covered with each other's chassis faces, respectively, and put in a state of being disabled from fulfilling the functions thereof.

[Configuration of Electronic Apparatus]

Figure 6:
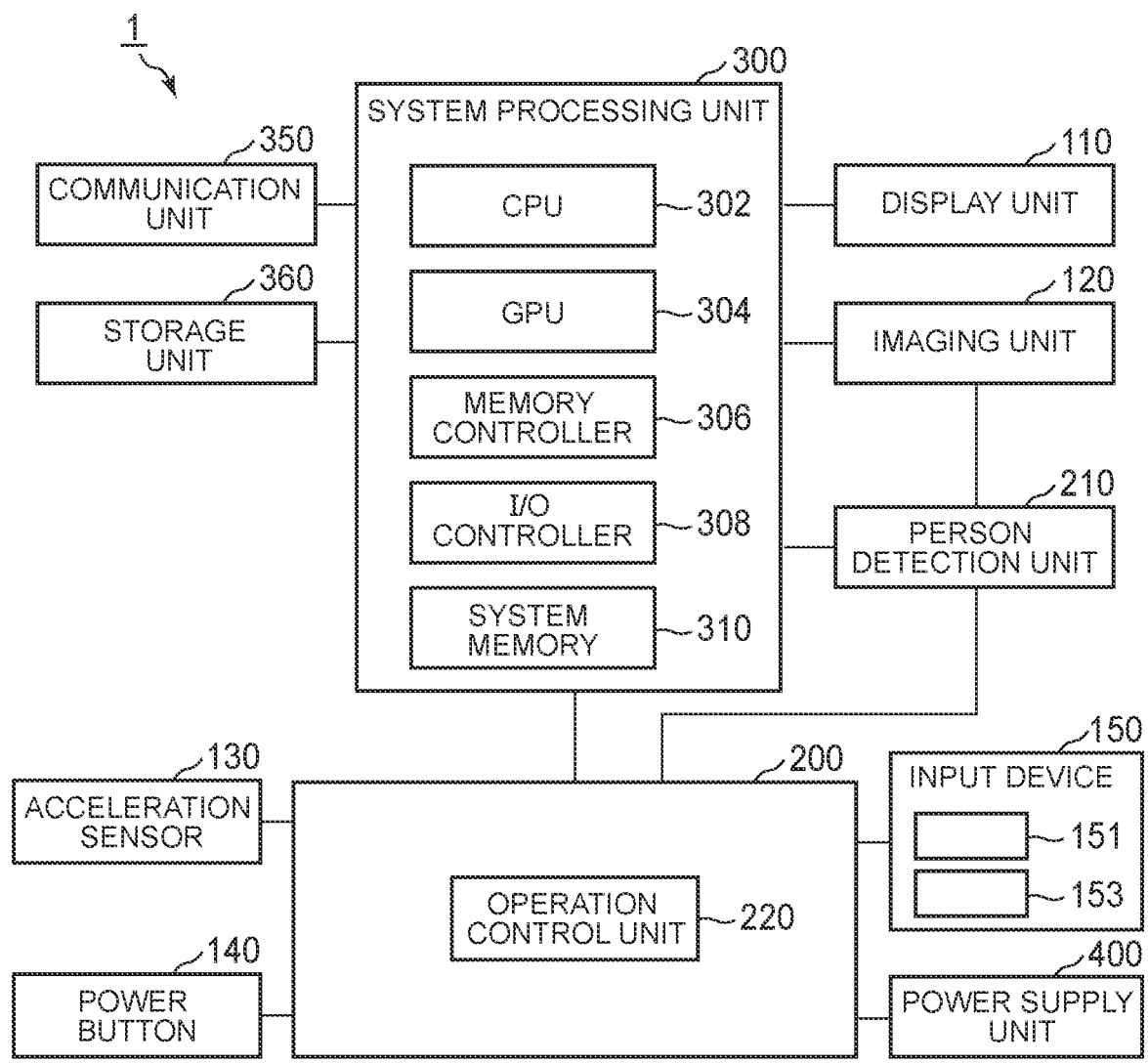
FIG. 6 is a schematic block diagram illustrating a configuration example of the electronic apparatus according to the first embodiment.

FIG. 6 is a schematic block diagram illustrating a configuration example of the electronic apparatus 1 according to the present embodiment. The electronic apparatus 1 is configured to include the display unit 110, the imaging unit 120, an acceleration sensor 130, the power button 140, the input device 150, an EC (Embedded Controller) 200, a person detection unit 210, a system processing unit 300, a communication unit 350, a storage unit 360, and a power supply unit 400. The display unit 110 displays display data (images) generated based on system processing executed by the system processing unit 300, processing of an application program running in the system processing, and the like.

The imaging unit 120 captures an image of an object within a predetermined angle of view in a direction (frontward) to face the inner face of the first chassis 10, and outputs the captured image to the system processing unit 300 and the person detection unit 210. The imaging unit 120 may be an infrared camera or a normal camera. The infrared camera is a camera including an infrared sensor as an image sensor. The normal camera is a camera including, as an image sensor, a visible light sensor for receiving a visible light beam (for example, an RGB camera). In the case of the normal camera, a captured image used for face detection may also be an image with reduced number of colors (for example, a monochrome image).

The acceleration sensor 130 detects the movement of the electronic apparatus 1 and outputs, to the EC 200, a detection signal indicative of the detection result. For example, when the electronic apparatus 1 is moved or the electronic apparatus 1 is moving unstably by being hand-held, the acceleration sensor 130 outputs a detection signal according to the movement. Note that a gyro sensor, a tilt sensor, a geomagnetic sensor, and the like may also be included instead of or in addition to the acceleration sensor 130.

The power button 140 outputs, to the EC 200, operation signals according to user's operations. The input device 150 is an input unit for accepting user's input, which is configured to include, for example, the keyboard 151 and the touch pad 153. In response to accepting operations on the keyboard 151 and the touch pad 153, the input device 150 outputs, to the EC 200, operation signals indicative of the content of the operations.

The power supply unit 400 supplies power through a power system for supplying power to each unit of the electronic apparatus 1 according to the operating state of each unit of the electronic apparatus 1. The power supply unit 400 includes a DC (Direct Current)/DC converter. The DC/DC converter converts the voltage of DC power, supplied from an AC (Alternate Current)/DC adapter or a battery pack, to a voltage required for each unit. The power with the voltage converted by the DC/DC converter is supplied to each unit through each power system. For example, the power supply unit 400 supplies power to each unit through each power system based on a control signal according to the operating state of each unit input from the EC 200.

The EC 200 is a microcomputer configured to include a CPU (Central Processing Unit), a RAM (Random Access Memory), a ROM (Read Only Memory), an I/O (Input/Output) logic circuit, and the like. The CPU of the EC 200 reads a control program (firmware) prestored in the ROM thereof and executes the read control program to fulfill the function. The EC 200 operates independently of the system processing unit 300 to control the operation of the system processing unit 300 and manage the operating state of the system processing unit 300. Further, the EC 200 is connected to the acceleration sensor 130, the power button 140, the input device 150, the person detection unit 210, the power supply unit 400, and the like.

For example, the EC 200 communicates with the power supply unit 400 to acquire information on a battery state (remaining battery capacity, and the like) from the power supply unit 400 and to output, to the power supply unit 400, a control signal or the like in order to control the supply of power according to the operating state of each unit of the electronic apparatus 1. Further, the EC 200 acquires operation signals from the power button 140 and the input device 150, and outputs, to the system processing unit 300, an operation signal related to processing of the system processing unit 300 among the acquired operation signals. Further, the EC 200 detects the movement of the electronic apparatus 1 based on the detection signal from the acceleration sensor 130. For example, based on the detection signal from the acceleration sensor 130, the EC 200 detects whether the electronic apparatus 1 is in a stationary state or a moving state. Further, the EC 200 includes an operation control unit 220 to control the operation of the system based on the detection result by the person detection unit 210.

The person detection unit 210 is a processor for processing image data of a captured image captured by the imaging unit 120. For example, the person detection unit 210 acquires the captured image captured by the imaging unit 120 through the system processing unit 300. Note that the person detection unit 210 may also acquire the captured image captured by the imaging unit 120 directly from the imaging unit 120. The person detection unit 210 detects the presence of the user by detecting a face area from the captured image to execute the HPD processing based on the detection result.

The person detection unit 210 detects the face area from the captured image captured by the imaging unit 120 to detect whether or not the user is present in front of the electronic apparatus 1. For example, when the user approaches the electronic apparatus 1, the person detection unit 210 changes the detection state from a state where the user is not present in front of the electronic apparatus 1 to a state where the user is present. Further, when the user is using the electronic apparatus 1 in front of the electronic apparatus 1, the person detection unit 210 is continuously detecting the state where the user is present in front of the electronic apparatus 1. Further, when the user has left the electronic apparatus 1, the person detection unit 210 changes the detection state from the state where the user is present in front of the electronic apparatus 1 to the state where the user is not present. Thus, the person detection unit 210 can detect whether or not the user is present in front of the electronic apparatus 1 to detect that the user approaches the electronic apparatus 1 (Approach), that the user is present in front of the electronic apparatus 1 (Presence), that the user has left the electronic apparatus 1 (Leave), that the user is absent in front of the electronic apparatus 1 (Absence), or the like. The configuration of this person detection unit 210 will be described in detail later.

The operation control unit 220 controls the operating state of the system according to the HPD processing. For example, in the standby state, when a change from the state where the user is not present in front of the electronic apparatus 1 to the state where the user is present (that is, the approach of the user to the electronic apparatus 1) is detected by the person detection unit 210, the operation control unit 220 boots the system in the standby state. Specifically, when the approach of the user to the electronic apparatus 1 is detected by the person detection unit 210, the operation control unit 220 instructs the system processing unit 300 to boot the system. More specifically, when the system is booted, the operation control unit 220 outputs, to the power supply unit 400, a control signal to supply power necessary for the operation of each unit of the electronic apparatus 1. After that, the operation control unit 220 outputs a boot signal to the system processing unit 300 to instruct the system processing unit 300 to boot the system. When acquiring the boot signal, the system processing unit 300 boots the system to make the transition from the standby state to the normal operating state.

Further, when the state where the user is present in front of the electronic apparatus 1 is continuously being detected by the person detection unit 210, the operation control unit 220 causes the system processing unit 300 to restrict the system not to make a transition to the standby state so as to continue the normal operating state. However, even when the state where the user is present is continuously being detected by the person detection unit 210, the operation control unit 220 may make the transition from the normal operating state to the standby state depending on a predetermined condition. The predetermined condition is, for example, that the duration of non-operation has lasted for a preset period of time, that an operation to make the transition to the standby state is performed, or the like.

Further, in normal operation, when a change from the state where the user is present in front of the electronic apparatus 1 to the state where the user is not present (that is, the leave of the user from the electronic apparatus 1) is detected by the person detection unit 210, the operation control unit 220 instructs the system processing unit 300 to cause the system to make the transition from the normal operating state to the standby state. More specifically, the operation control unit 220 outputs, to the system processing unit 300, a standby signal to instruct the system processing unit 300 to cause the system to make the transition from the normal operating state to the standby state. When acquiring the standby signal, the system processing unit 300 causes the system to make the transition from the normal operating state to the standby state. After that, the operation control unit 220 outputs a control signal to the power supply unit 400 to stop the supply of power unnecessary in the standby state.

The system processing unit 300 is configured to include a CPU (Central Processing Unit) 302, a GPU (Graphic Processing Unit) 304, a memory controller 306, an I/O (Input-Output) controller 308, and a system memory 310, where processes of various application programs are executable on an OS (Operating System) by system processing based on the OS. The CPU 302 and the GPU 304 may be collectively called a processor.

The CPU 302 executes processing by the OS and processing by the application programs running on the OS. Further, the CPU 302 causes the operating state of the system to make a transition based on the control of the operating state of the system by the EC 200 (operation control unit 220). For example, when the operating state is the standby state and the boot signal is input from the EC 200, the CPU 302 executes boot processing to make the transition from the standby state to the normal operating state. After completion of the boot processing, the CPU 302 starts the execution of system processing based on the OS. For example, when the operating state is the standby state and the boot signal is input from the EC 200, the CPU 302 resumes the execution of the application programs the execution of which is suspended.

In the boot processing, the CPU 302 executes login processing to determine whether to allow access to the OS or not. When the boot processing by the OS is started, the CPU 302 executes the login processing before allowing the access to the OS, and the transition to the normal operating state is paused until login is allowed in the login processing. In the login processing, user authentication processing is performed to determine whether or not a person using the electronic apparatus 1 is a preregistered, authorized user. As the authentication, there are password authentication, face authentication, fingerprint authentication, and the like. When the authentication result is successful, the CPU 302 allows the login and resumes the execution of the paused system processing. On the other hand, when the authentication result is unsuccessful, the CPU 302 does not allow the login and leaves the execution of the system processing paused.

The GPU 304 is connected to the display unit 110. The GPU 304 executes image processing under the control of the CPU 302 to generate display data. The GPU 304 outputs the generated display data to the display unit 110. Note that the CPU 302 and the GPU 304 may be integrally formed as one core, or the load may be shared between the CPU 302 and the GPU 304 formed as individual cores, respectively. The number of processors is not limited to one, and it may be plural.

The memory controller 306 controls reading data from and writing data to the system memory 310, the storage unit 360 and the like by the CPU 302 and the GPU 304.

The I/O controller 308 controls input/output of data from the communication unit 350, the display unit 110, and the EC 200.

The system memory 310 is used as a reading area of an execution program of the processor and a working area to write processed data. Further, the system memory 310 temporarily stores image data of a captured image(s) captured by the imaging unit 120.

The communication unit 350 is connected to other devices communicably through a wireless or wired communication network to transmit and receive various data. For example, the communication unit 350 is configured to include a wired LAN interface such as the Ethernet (registered trademark), a wireless LAN interface such as Wi-Fi (registered trademark), and the like.

The storage unit 360 is configured to include storage media, such as an HDD (Hard Disk Drive) or an SDD (Solid State Drive), a RAM, a ROM, and the like. The storage unit 360 stores the OS, device drivers, various programs such as applications, and various data acquired by the operation of the programs.

[Configuration of Person Detection Unit]

Next, the configuration of the person detection unit 210 will be described in detail. The person detection unit 210 detects the user present in front of the electronic apparatus 1 by detecting face areas respectively from captured images captured by the imaging unit 120 at predetermined time intervals.

Figure 7:
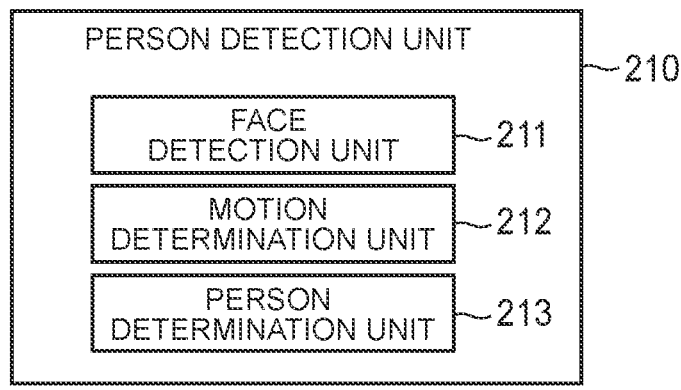
FIG. 7 is a block diagram illustrating an example of the configuration of a person detection unit according to the first embodiment.

FIG. 7 is a block diagram illustrating an example of the configuration of the person detection unit 210 according to the present embodiment. The person detection unit 210 illustrated includes a face detection unit 211, a motion determination unit 212, and a person determination unit 213.

The face detection unit 211 detects face areas with faces captured therein from captured images captured at the predetermined time intervals, respectively. For example, the face detection unit 211 processes image data of plural images captured by the imaging unit 120 at the predetermined time intervals and stored in the system memory 310 to detect face areas with faces captured therein from among the plural images. As the face detection method, any detection method using a face detection algorithm to detect a face based on face feature information, trained data (learned model) subjected to machine learning based on face feature information, a face detection library, or the like can be applied. Further, for example, although the predetermined time intervals can be 15 second intervals or 10 second intervals, the predetermined time intervals can be set to any time intervals. In the case of the shortest time intervals, face areas in all consecutive frames are detected frame by frame. The face detection unit 211 detects face areas from respective captured images, and outputs face detection information including the detected face areas and the center coordinates.

The motion determination unit 212 determines whether or not there is motion in the face based on the face areas detected by the face detection unit 211 from the plural captured images. For example, the motion determination unit 212 determines whether or not there is motion in the face based on the face areas detected respectively from the captured images captured at the predetermined time intervals over a predetermined period. Specifically, the motion determination unit 212 calculates the amount of change in face area position detected from the plural captured images, and determines whether or not there is motion in the captured face over the predetermined time intervals based on the amount of change.

Figure 8:
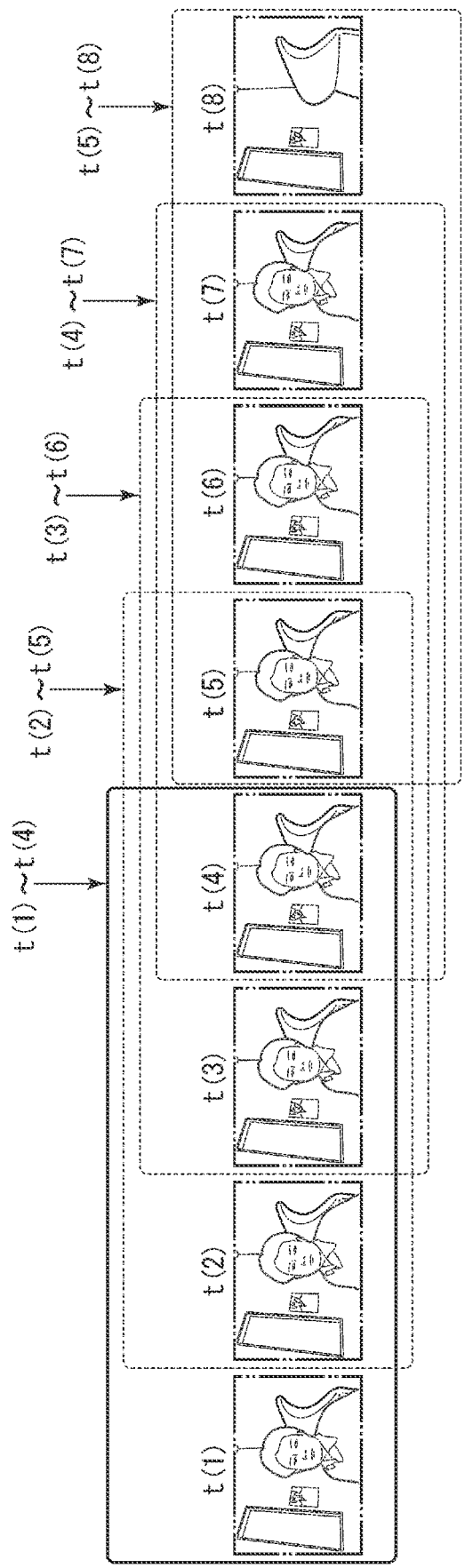
FIG. 8 is a diagram illustrating an example of captured images used to detect the motion of a face according to the first embodiment.

FIG. 8 is a diagram illustrating an example of captured images used by the motion determination unit 212 to detect the motion of a face. Captured images from time t(1) to time t(8) are lined up in chronological order. For example, the motion determination unit 212 determines the motion of the face by using past four frames of captured images. In this case, the predetermined period corresponds to a period of four frames. For example, when captured images at 15 second intervals are used, the predetermined period described above (the period of four frames) is 45 seconds.

At the time of acquiring a captured image at time t(4), the motion determination unit 212 determines the motion of the face based on face areas detected from four frames of captured images from time t(1) to time t(4). At the time of acquiring a captured image at time t(5), the motion determination unit 212 determines the motion of the face based on face areas detected from four frames of captured images from time t(2) to time t(5). At the time of acquiring a captured image at time t(6), the motion determination unit 212 determines the motion of the face based on face areas detected from four frames of captured images from time t(3) to time t(6). At the time of acquiring a captured image at time t(7), the motion determination unit 212 determines the motion of the face based on face areas detected from four frames of captured images from time t(4) to time t(7). At the time of acquiring a captured image at time t(8), the motion determination unit 212 determines the motion of the face based on face areas detected from four frames of captured images from time t(5) to time t(8).

For example, the motion determination unit 212 calculates a variation in the center coordinates of the face areas detected from the past four frames of captured images, and when the variation is equal to or more than a predetermined threshold value, the motion determination unit 212 determines that there is motion in the face. On the other hand, when the variation is less than the predetermined threshold value, the motion determination unit 212 determines that there is no motion in the face. Note that a standard deviation or dispersion may also be used as the variation value. Further, when the center coordinates of each face area is expressed in a two-dimensional XY-coordinate system, both of X and Y coordinates may be used, or either one of the coordinates may be used. Further, instead of or in addition to the variation in the center coordinates of the face areas, a variation in face area or a variation in face area size may also be used for motion determination. When the variation in face area size is used, back-and-forth motion of the face can also be determined.

Further, the motion determination unit 212 may register a face area in which no motion is determined from among faces detected from the captured images, and exclude the registered area from determination targets after that. For example, the motion determination unit 212 ignores the area even when a face is detected in the area excluded from the determination targets, and does not make the determination of the motion of the face. Note that when it is detected that the electronic apparatus 1 is moved from the detection result of the acceleration sensor 130, the motion determination unit 212 resets the determination areas. In other words, the motion determination unit 212 returns the area registered as the area excluded from the determination targets to a determination target.

When it is determined by the motion determination unit 212 that there is motion in the face detected from the respective captured images, the person determination unit 213 determines that the user is present. On the other hand, when it is determined by the motion determination unit 212 that there is no motion in the face detected from the respective captured images, the person determination unit 213 determines that the face is not the face of the user, and determines that the user is not present.

[Operation of HPD Processing]

Figure 9:
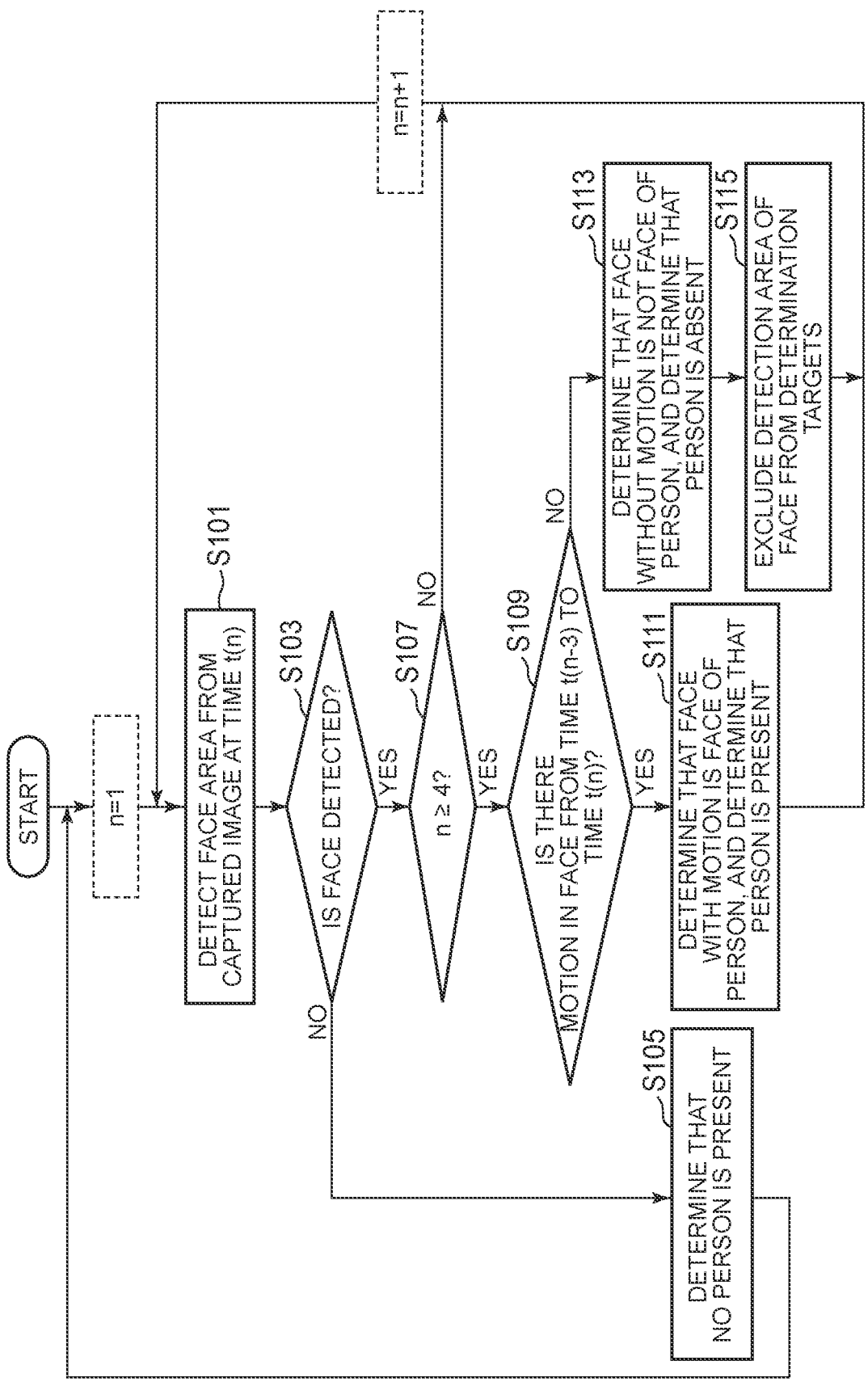
FIG. 9 is a flowchart illustrating an example of HPD processing according to the first embodiment.

Referring next to FIG. 9, the operation of the HPD processing (person detection processing) executed by the person detection unit 210 will be described.

FIG. 9 is a flowchart illustrating an example of the HPD processing according to the present embodiment.

(Step S101) The person detection unit 210 detects a face area from a captured image captured by the imaging unit 120 at time t(n). First, the person detection unit 210 sets n=1, and detects a face area from a captured image captured by the imaging unit 120 at time t(1).

(Step S103) The person detection unit 210 determines whether or not a face area can be detected from the captured image in step S101. When any face area cannot be detected from the captured image in step S101 (NO), the person detection unit 210 proceeds to a process of step S105. On the other hand, when a face area can be detected from the captured image in step S101 (YES), the person detection unit 210 proceeds to a process of step S107.

(Step S105) The person detection unit 210 determines that no user is present. Then, the person detection unit 210 sets n to 1, returns to the process of step S101, and detects a face area from a captured image captured by the imaging unit 120 at time t(1) again.

(Step S107) The person detection unit 210 determines whether or not n is 4 or more. In other words, the person detection unit 210 determines whether or not face areas are detected from captured images over four frames. When determining that n is less than 4 (NO), the person detection unit 210 increments n by 1, returns to the process of step S101, and detects a face area captured by the imaging unit 120 at the next time t(n). For example, when a face area is already detected from the captured image at time t(1), the person detection unit 210 detects a face area from a captured image at time t(2), then when a face area is detected from the captured image at time t(2), the person detection unit 210 detects a face area from a captured image at time t(3), and further when a face area is detected from the captured image at time t(3), the person detection unit 210 detects a face area from a captured image at time t(4). On the other hand, when determining that n is 4 or more (YES), that is, when determining that face areas are detected from captured images over four frames, the person detection unit 210 proceeds to a process of step S109.

(Step S109) At the time of acquiring a captured image at time t(n), the person detection unit 210 determines whether or not there is motion in the face based on the face areas detected from four frames of captured images from time t(n−3) to time t(n). For example, at the time of acquiring a captured image at time t(4), the person detection unit 210 determines whether or not there is motion in the face based on the face areas detected from four frames of captured images from time t(1) to time t(4). For example, the person detection unit 210 determines whether or not there is motion in the face based on a variation in the center coordinates of the face areas detected from the respective captured images from time t(1) to time t(4). When determining that there is motion in the face (YES), the person detection unit 210 proceeds to a process of step S111. On the other hand, when determining that there is no motion in the face (NO), the person detection unit 210 proceeds to a process of step S113.

(Step S111) The person detection unit 210 determines that the face with motion is the face of the user, and determines that the user is present. In other words, the person detection unit 210 determines that the user is present in front of the electronic apparatus 1. Then, the person detection unit 210 increments n by 1, returns to the process of step S101, and detects a face area captured by the imaging unit 120 at the next time t(n).

(Step S113) The person detection unit 210 determines that the face without motion is not the face of the user, and determines that the user is absent. In other words, the person detection unit 210 determines that the user is absent in front of the electronic apparatus 1. Then, the person detection unit 210 proceeds to a process of step S115.

(Step S115) The person detection unit 210 registers, as a determination exclusion area, the face area determined to be without motion, and excludes the determination exclusion area from determination targets after that. Then, the person detection unit 210 increments n by 1, returns to the process of step S101, and detects a face area from a captured image captured by the imaging unit 120 at the next time t(n). After that, even when a face is detected in the area excluded from the determination targets, the person detection unit 210 does not make the determination of the motion of the face (that is, the determination of whether it is the user or not) as not being the face of the user.

In the present embodiment, the period to determine the motion of the face is set to the period of four frames, but the present invention is not limited thereto, and any period can be set.

Figure 10:
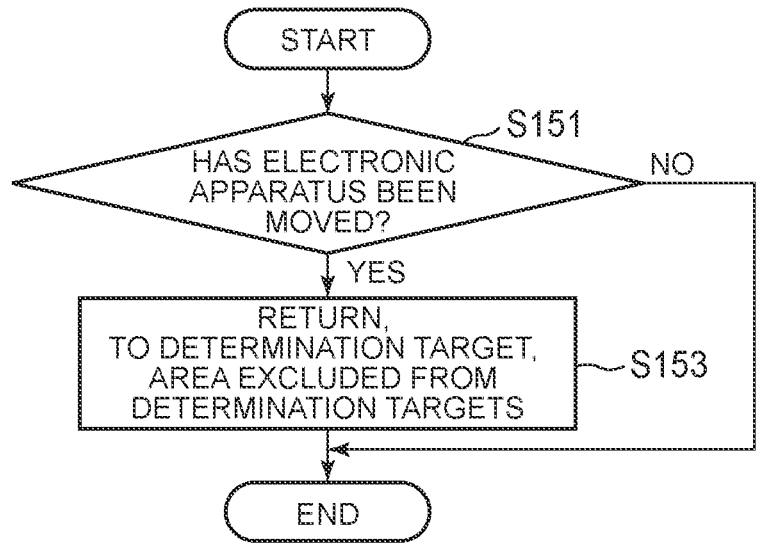
FIG. 10 is a flowchart illustrating an example of determination area resetting processing according to the first embodiment.

Referring next to FIG. 10, the operation of determination area resetting processing to rest the determination exclusion area registered in step S115 of FIG. 9 will be described.

FIG. 10 is a flowchart illustrating an example of determination area resetting processing according to the present embodiment.

(Step S151) Based on the detection result of the acceleration sensor 130, the person detection unit 210 determines whether or not the electronic apparatus 1 has been moved. When determining that the electronic apparatus 1 has been moved (YES), the person detection unit 210 proceeds to a process of step S153. On the other hand, when determining that the electronic apparatus 1 has not been moved (NO), the person detection unit 210 ends the processing without resetting the determination area.

(Step S153) The person detection unit 210 resets the registered determination exclusion area and ends the processing. In other words, the person detection unit 210 returns, to a determination target, the area (determination exclusion area) registered as the area excluded from the determination targets.

For example, the person detection unit 210 executes this determination area resetting processing in a predetermined cycle. Note that the person detection unit 210 may execute this determination area resetting processing only when the area excluded from the determination targets is registered in step S115 of FIG. 9.

[Operation of Operating State Control Processing]

Next, the operation of operating state control processing to control the operating state of the system based on the result of the HPD processing described above will be described. First, the operation of boot processing caused by the operation control unit 220 to boot the system as a result of the fact that the approach of the user to the electronic apparatus 1 is detected by the HPD processing will be described.

Figure 11:
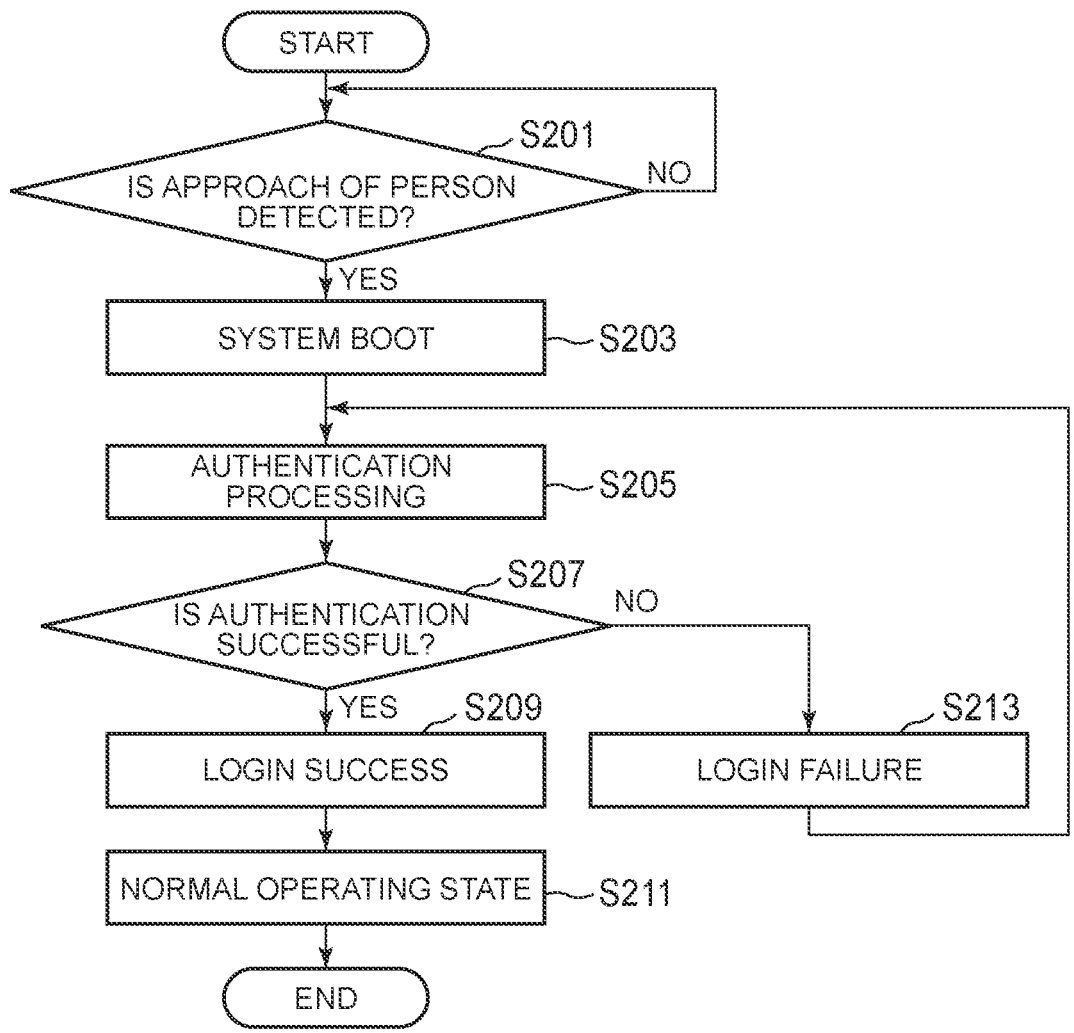
FIG. 11 is a flowchart illustrating an example of boot processing according to the first embodiment.

FIG. 11 is a flowchart illustrating an example of boot processing according to the present embodiment. Here, it is assumed that the electronic apparatus 1 is placed on a desk or the like in the open state, and the operating state thereof is the standby state.

(Step S201) The operation control unit 220 determines whether or not the approach of the user to the electronic apparatus 1 is detected. When determining that a change from a state where the user is not present in front of the electronic apparatus 1 to a state where the user is present (i.e., the approach of the user to the electronic apparatus 1) is detected by the person detection unit 210 (YES), the operation control unit 220 proceeds to a process of step S203. On the other hand, when determining that the state where the user is absence (i.e., that the user does not approach the electronic apparatus 1) is detected by the person detection unit 210 (NO), the operation control unit 220 performs the process of step S201 again.

(Step S203) The operation control unit 220 causes the system processing unit 300 to boot the system. Specifically, when causing the system processing unit 300 to boot the system, the operation control unit 220 outputs, to the power supply unit 400, the control signal to supply power necessary for the operation of each unit of the electronic apparatus 1. Further, the operation control unit 220 outputs, to the system processing unit 300, the boot signal to instruct the system processing unit 300 to boot the system. When acquiring the boot signal, the system processing unit 300 starts boot processing. Then, the system processing unit 300 proceeds to a process of step S205.

(Step S205) The system processing unit 300 executes login processing (authentication processing). For example, the system processing unit 300 executes login processing by password authentication, face authentication, fingerprint authentication, or the like, and proceeds to a process of step S207.

(Step S207) The system processing unit 300 determines whether or not the authentication result is successful. When determining that the authentication result is successful (YES), the system processing unit 300 proceeds to a process of step S209. On the other hand, when determining that the authentication result is unsuccessful (NO), the system processing unit 300 proceeds to a process of step S213.

(Step S209) When the authentication result is successful, the system processing unit 300 notifies that the login is successful (for example, displays the notification on the display unit 110), and continues the boot processing. Then, the system processing unit 300 proceeds to a process of step S211.

(Step S211) The system processing unit 300 completes the login processing, and causes the operating state of the system to make the transition to the normal operating state.

(Step S213) When the authentication result is unsuccessful, the system processing unit 300 notifies that the login is unsuccessful (for example, displays the notification on the display unit 110), and returns to the authentication process in step S205. Note that the system processing unit 300 may stop the authentication processing to make a transition to a login disabled state when the authentication process fails continuously a predetermined number of times.

Next, the operation of transition-to-standby state processing in which the operation control unit 220 causes the system to make the transition from the normal operating state to the standby state as a result of the fact that the leave of the user from the electronic apparatus 1 is detected will be described.

Figure 12:
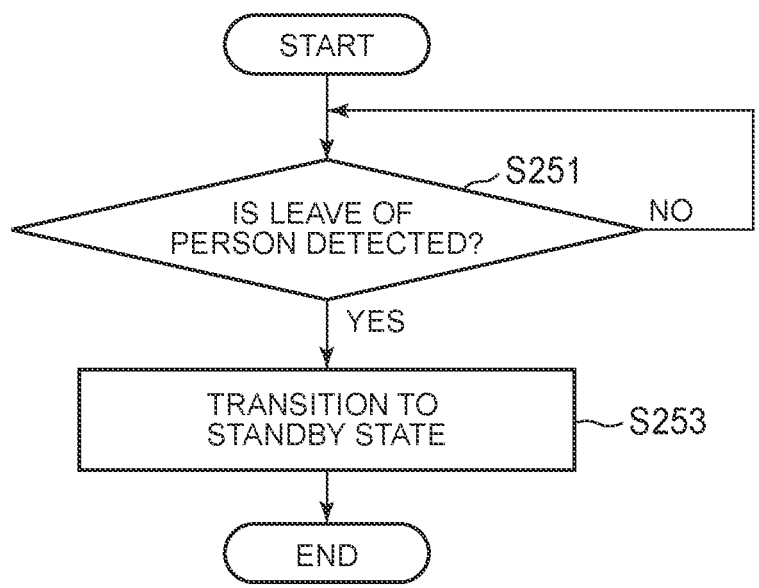
FIG. 12 is a flowchart illustrating an example of transition-to-standby state processing according to the first embodiment.

FIG. 12 is a flowchart illustrating an example of transition-to-standby state processing according to the present embodiment. Here, it is assumed that the electronic apparatus 1 is placed on the desk or the like in the open state, and the operating state thereof is the normal operating state.

(Step S251) The operation control unit 220 determines whether or not the leave of the user from the electronic apparatus 1 is detected. When a change from a state where the user is present to a state where the user is not present (i.e., the leave of the user from the electronic apparatus 1) is detected by the person detection unit 210 (YES), the operation control unit 220 proceeds to a process of step S253. On the other hand, when the state where the user is present (i.e., the user does not leave the electronic apparatus 1) is detected by the person detection unit 210 (NO), the operation control unit 220 performs the process of step S251 again.

(Step S253) The operation control unit 220 causes the operating state of the system to make the transition from the normal operating state to the standby state by the system processing unit 300. Specifically, the operation control unit 220 outputs, to the system processing unit 300, the standby signal to instruct the system processing unit 300 to cause the system to make the transition to the standby state. When acquiring the standby signal, the system processing unit 300 causes the operating state of the system to make the transition from the normal operating state to the standby state. Further, the operation control unit 220 outputs, to the power supply unit 400, the control signal to stop the supply of power unnecessary in the standby state.

Summary of First Embodiment

As described above, the electronic apparatus 1 according to the present embodiment includes the system memory 310 (an example of a memory) for temporarily storing image data of images (captured images) captured by the imaging unit 120 (an example of an imaging device), and a person detection unit 210 (an example of a processor) for processing the image data stored in the system memory 310. The person detection unit 210 processes image data of plural captured images captured by the imaging unit 120 at predetermined time intervals and stored in the system memory 310, and detects face areas with a face captured therein from among the plural captured images. Further, the person detection unit 210 calculates the amount of change in face area position detected from the plural captured images, and determines whether or not there is motion in the captured face over predetermined time intervals based on the amount of change. Then, when determining that there is motion in the captured face, the person detection unit 210 determines that the user is present.

Thus, since the electronic apparatus 1 determines, to be the user, only the face with motion among detected faces, the presence of the user can be detected accurately. Therefore, the electronic apparatus 1 can accurately detect the person using the electronic apparatus 1.

For example, based on the face areas detected respectively from the captured images captured at predetermined time intervals over a predetermined period, the person detection unit 210 determines whether or not there is motion in the face.

Thus, since the electronic apparatus 1 determines whether or not there is motion in the face based on the motion of the face over the predetermined period, the presence of the user can be detected accurately. Therefore, the electronic apparatus 1 can accurately detect the person using the electronic apparatus 1.

Further, when determining that there is no motion in a captured face, the person detection unit 210 determines that the face is not the face of the user, and determines that the user is absent.

Thus, since the electronic apparatus 1 determines that a face without motion among detected faces is not the user, this can prevent a face in a photo or a poster from being determined to be the user by mistake. The electronic apparatus 1 can prevent the user who is absent from being detected erroneously. Further, even when there is a face in the photo or the poster behind the user, the electronic apparatus 1 can prevent the face from erroneously detecting that any other person looking from behind the user is present.

Further, the person detection unit 210 registers the area of a face in which no motion is determined among faces detected from respective captured images, and excludes the registered area from determination targets after that.

Thus, since the electronic apparatus 1 excludes the area with the face detected not to be the face of the user from the determination targets after that, the electronic apparatus 1 can reduce the processing load and prevent erroneous detection.

Further, the electronic apparatus 1 includes the acceleration sensor 130 (an example of a sensor) to detect the movement of the electronic apparatus 1. Using the acceleration sensor 130, when it is detected that the electronic apparatus 1 is moved, the person detection unit 210 returns the registered area to a determination target.

Thus, when the electronic apparatus 1 is moved, since the area excluded from the determination targets also changes, the electronic apparatus 1 can return the area to the determination target to detect the presence of the user properly.

Further, the electronic apparatus 1 includes the system processing unit 300 (an example of a processing unit) to execute system processing based on the system. When a transition from a state where the presence of the user is determined to a state where the absence of the user is determined is made, the electronic apparatus 1 causes the operating state of the system to make the transition to the standby state (an operating state in which at least part of the system processing is limited).

Thus, the electronic apparatus 1 can detect the leave of the user accurately and make the transition to the standby state properly.

Further, a control method for the electronic apparatus 1 according to the present embodiment, where the electronic apparatus 1 includes the system memory 310 (the example of the memory) for temporarily storing image data of images (captured images) captured by the imaging unit 120 (the example of the imaging device), and the person detection unit 210 (the example of the processor) for processing the image data stored in the system memory 310, includes: a step of causing the person detection unit 210 to process image data of plural captured images captured by the imaging unit 120 at predetermined time intervals and stored in the system memory 310, and detect face areas with a face captured therein from among the plural captured images; a step of calculating the amount of change in the face area position detected from the plural captured images, and determining whether or not there is motion in the captured face over the predetermined time intervals based on the amount of change; and a step of determining that the user is present when determining that there is motion in the captured face.

Thus, since the electronic apparatus 1 determines that only the face with motion among detected faces is the user, the presence of the user can be detected accurately. Therefore, the electronic apparatus 1 can accurately detect the person using the electronic apparatus 1.

Second Embodiment

Next, a second embodiment of the present invention will be described.

In the first embodiment, the aspect of detecting the presence of the user by detecting face areas from captured images to detect the presence of the user is described, but it is desired to reduce the processing load related to face detection in consideration of the impact on power consumption, other processing, and the like. Therefore, in this embodiment, the electronic apparatus 1 performs processing using either of high-resolution images and low-resolution images depending on the situation when detecting face areas from captured images. In the following, a detection mode for detecting face areas using low-resolution images is called a "low-resolution mode," and a detection mode for detecting face areas using high-resolution images is called a "high-resolution mode."

Note that various methods are considered as the method of acquiring the high-resolution images and the low-resolution images. When the imaging unit 120 capable of outputting both the high-resolution images and the low-resolution images is used, the electronic apparatus 1 can have such a configuration as to instruct the imaging unit 120 to output either of the images depending on the situation. Alternatively, when the imaging unit 120 capable of outputting both the high-resolution images and the low-resolution images at the same time is used, the electronic apparatus 1 can have such a configuration as to select either of images, output from the imaging unit 120 depending on the situation, as images to be processed depending on the situation. In addition to them, or besides them, the electronic apparatus 1 may have such a configuration as to perform preprocessing to decrease the resolution of image data of images output from the imaging unit 120 to acquire low-resolution images to be processed.

Here, in the low-resolution mode, the processing load is small and the power consumption is reduced, but subtle motion of the face may not be able to be detected because the resolution is low, and hence the presence of the user may not be able to be detected correctly.

Figure 13:
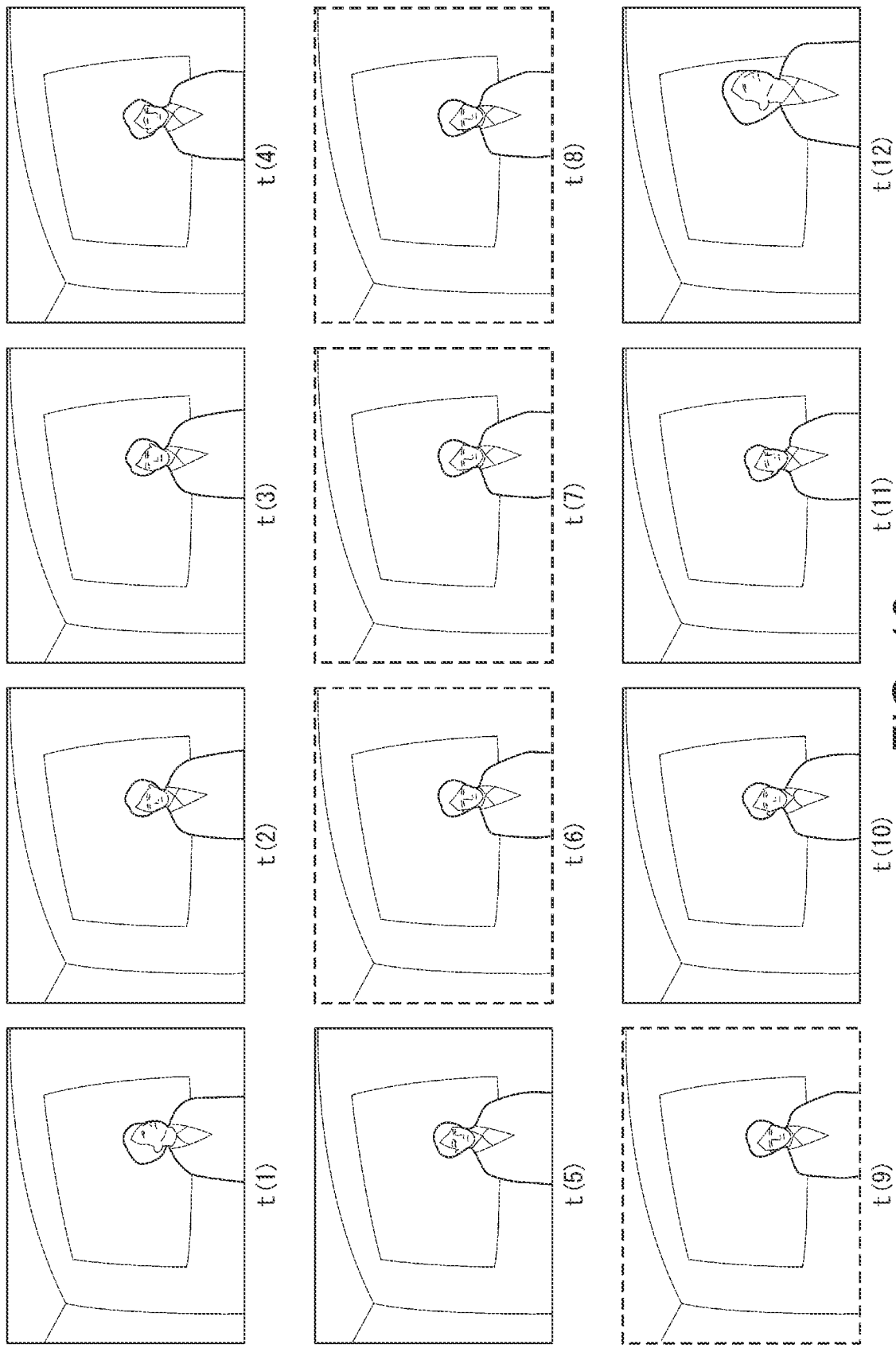
FIG. 13 is a diagram illustrating an example of person detection results in a low-resolution mode.

FIG. 13 is a diagram illustrating an example of person detection results in the low-resolution mode. In the illustrated example, the user is captured in all captured images from time t(1) to time t(12). Although a face is detected from each of the captured images, subtle motion of the face may not be able to be detected if there is a period when the user hardly moves. In the illustrated example, a case where it is determined that there is motion in the face detected in periods from time t(1) to time t(5) and from time t(10) to time t(12), but determined that there is no motion in the face detected in a period from time t(6) to time t(8) is illustrated. For example, when captured images are captured at 5 second intervals, if a state where the user hardly moves lasts for 20 seconds or more and it is determined that there is no motion in the face for a predetermined period (for example, four frames), it will be determined that the user is absent.

Therefore, when it is determined that there is no motion in the face detected in the low-resolution mode, the electronic apparatus 1 exits the low-resolution mode. In other words, when it is determined that there is no motion in the face detected in the low-resolution mode, the electronic apparatus 1 detects the motion of the face in high resolution to check the motion of the face in more detail. Since the high-resolution mode is higher in resolution than the low-resolution mode, the motion of the face may be able to be detected in the high-resolution mode even if the motion of the face cannot be detected in the low-resolution mode.

The basic configuration of the electronic apparatus 1 according to the present embodiment is the same as the configuration according to the first embodiment illustrated in FIG. 5 to FIG. 7, and the description thereof will be omitted. This embodiment is different from the first embodiment in that the face detection unit 211 detects face areas in the low-resolution mode or the high-resolution mode. Here, functions and processing different from those in the first embodiment will be described.

The face detection unit 211 detects a face area from a captured image in the low-resolution mode or the high-resolution mode. As a default setting, the face detection unit 211 sets the detection mode to the low-resolution mode to process image data of low-resolution captured images to detect face areas. The motion determination unit 212 determines whether or not there is motion in the face based on the face areas respectively detected by the face detection unit 211 from the captured images in the low-resolution mode.

Further, when it is determined by the motion determination unit 212 that there is no motion in the face detected in the low-resolution mode, the face detection unit 211 switches the detection mode from the low-resolution mode to the high-resolution mode. In other words, when it is determined by the motion determination unit 212 that there is no motion in the face detected in the low-resolution mode, the face detection unit 211 processes image data of captured images higher in resolution than those in the low-resolution mode to detect face areas. Based on the face areas detected respectively from captured images in the high-resolution mode, the motion determination unit 212 determines whether or not there is motion in the face. Further, when any face area is no longer detected in the high-resolution mode, the face detection unit 211 returns the detection mode from the high-resolution mode to the low-resolution mode to detect face areas in the low-resolution mode.

Figure 14:
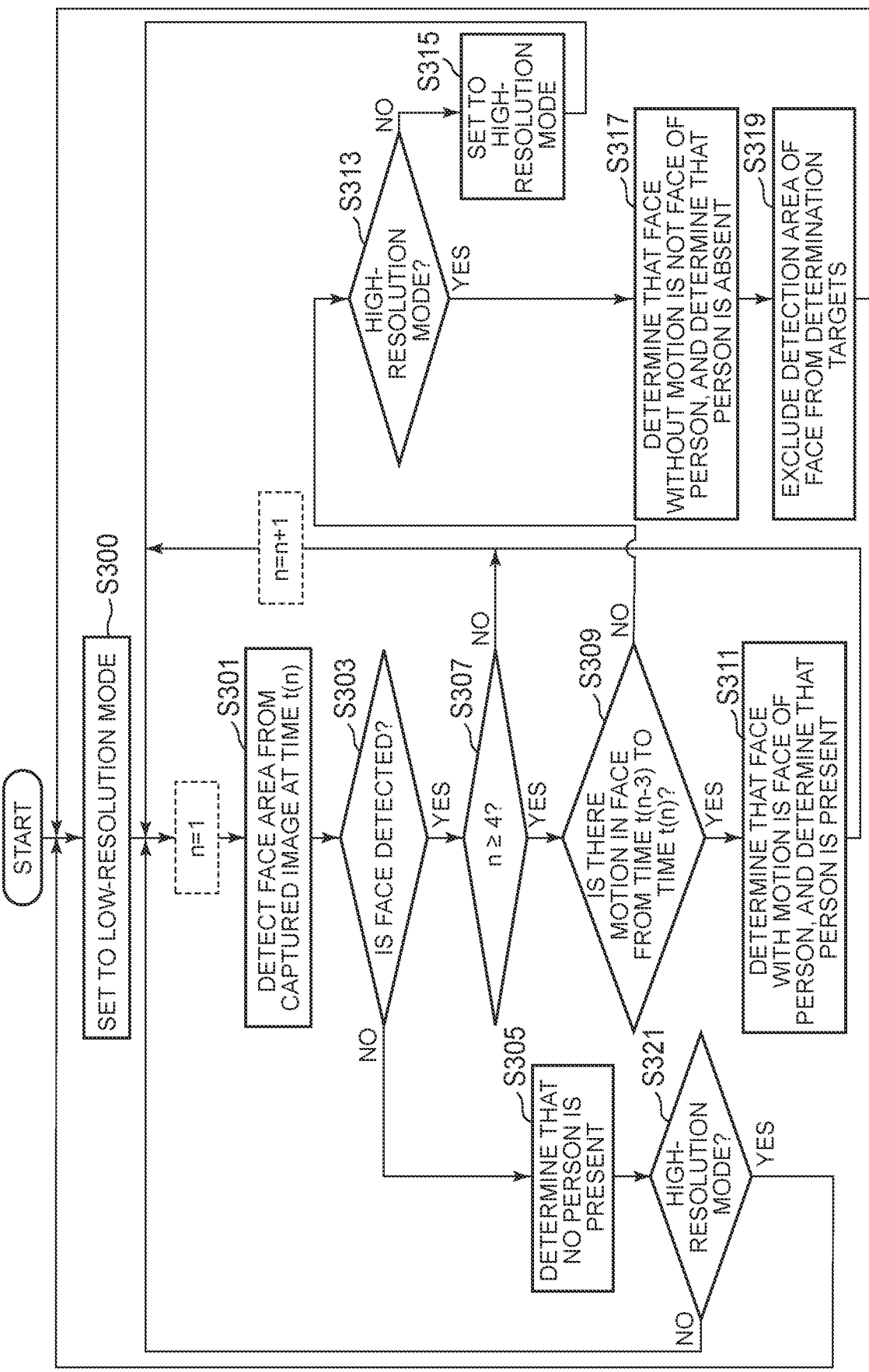
FIG. 14 is a flowchart illustrating an example of HPD processing according to a second embodiment.

Referring next to FIG. 14, the operation of HPD processing (person detection processing) executed by the person detection unit 210 will be described.

FIG. 14 is a flowchart illustrating an example of HPD processing according to the present embodiment. In FIG. 14, processes of step S301 to step S311 are the same as those of step S101 to step S111 illustrated in FIG. 9, and the description thereof will be omitted.

First, the person detection unit 210 sets the detection mode to the low-resolution mode (step S300), and proceeds to a process of step S301. Thus, in step S301 to step S309, the person detection unit 210 detects face areas from captured images in the low-resolution mode to determine whether or not there is motion in the face detected.

When it is determined in step S309 that there is no motion in the face (NO), the person detection unit 210 determines whether or not the current detection mode is the high-resolution mode (step S313). Here, since the detection mode is the low-resolution mode, the person detection unit 210 determines NO in step S313, and proceeds to a process of step S315.

In step S315, the person detection unit 210 sets the detection mode to the high-resolution mode, and returns to the process of step S301. Thus, the detection mode is switched from the low-resolution mode to the high-resolution mode. In step S301 to step S309, the person detection unit 210 detects face areas from captured images in the high-resolution mode, and determines whether or not there is motion in the face detected. When determining that there is motion in the face in the high-resolution mode even though determining that there is no motion in the face in the low-resolution mode (step S309: YES), the person detection unit 210 determines that the user is present (step S311).

On the other hand, when determining that there is no motion in the face even in the high-resolution mode (step S309: NO), the person detection unit 210 determines whether or not the current detection mode is the high-resolution mode (step S313). Here, since the detection mode is the high-resolution mode, the person detection unit 210 determines YES in step S313, and proceeds to a process of step S317.

In step S317, the person detection unit 210 determines that the face without motion is not the face of a person, and determines that the user is absent. In other words, the person detection unit 210 determines that the user is absent in front of the electronic apparatus 1. Then, the person detection unit 210 proceeds to a process of step S319.

In step S319, the person detection unit 210 registers, as a determination exclusion area, a face area determined to be no motion to exclude the registered determination exclusion area from determination targets after that. Since then, when a face area is detected in the determination exclusion area both in the low-resolution mode and the high-resolution mode, the person detection unit 210 determines that it is not the face of the user, and does not determine the motion of face (i.e., does not determine whether or not the face is the user). Then, the person detection unit 210 returns to the process of step S300 to set the detection mode to the low-resolution mode. Thus, the detection mode is switched from the high-resolution mode to the low-resolution mode.

Further, when any face area cannot be detected from a captured image in the high-resolution mode (step S303: NO), the person detection unit 210 determines that the user is absent (step S305). Then, the person detection unit 210 proceeds to step S321 to determine whether or not the current detection mode is the high-resolution mode. In step S321, when determining that the detection mode is the high-resolution mode (YES), the person detection unit 210 returns to step S300 to set the detection mode to the low-resolution mode. Thus, the detection mode is switched from the high-resolution mode to the low-resolution mode. On the other hand, when determining in step S321 that the detection mode is the low-resolution mode (NO), the person detection unit 210 returns to the process of step S301 to detect, in step S301 to step S309, face areas from captured images in the low-resolution mode in order to determine whether or not there is motion in the face detected.

Summary of Second Embodiment

As described above, in the electronic apparatus 1 according to the present embodiment, image data of captured images captured by the imaging unit 120 includes low resolution (first resolution) image data. Then, the person detection unit 210 executes the low-resolution mode to process low-resolution image data so as to detect face areas in order to determine whether or not there is motion in the face based on the face areas detected in the low-resolution mode.

Thus, since the electronic apparatus 1 determines that only the face with motion among detected faces is the user while reducing the impact on power consumption, other processing, and the like, the presence of the user can be detected accurately. Therefore, the electronic apparatus 1 can accurately detect the person using the electronic apparatus 1.

Further, in the electronic apparatus 1 according to the present embodiment, image data of captured images captured by the imaging unit 120 includes high-resolution (second-resolution) image data rather than low-resolution (first-resolution) image data. The person detection unit 210 processes the high-resolution image data, executes the high-resolution mode to detect face areas, and determines whether or not there is motion in the face based on the face areas detected in the high-resolution mode.

Thus, since the electronic apparatus 1 determines whether or not there is motion in the face in the high-resolution mode when no motion of the face is detected in the low-resolution mode, erroneous detection can also be prevented while reducing the impact on power consumption, other processing, and the like.

Further, when any face area is no longer detected in the high-resolution mode, the electronic apparatus 1 executes detection of face areas in the low-resolution mode.

Thus, since the electronic apparatus 1 returns the detection mode to the low-resolution mode when the user is gone when making detection in the high-resolution mode, wasted power consumption and the impact on other processing can be prevented.

While the first and second embodiments of this invention have been described in detail above with reference to the accompanying drawings, the specific configurations are not limited to the above-described embodiments, and design changes are included without departing from the scope of this invention. For example, the respective constituent elements in the respective embodiments described above can be combined arbitrarily.

Further, in the aforementioned embodiments, the configuration example in which the imaging unit 120 is built in the electronic apparatus 1 is described, but the present invention is not limited to this example. For example, the imaging unit 120 does not have to be built in the electronic apparatus 1, which may also be attachable to the electronic apparatus 1 (for example, onto any of the side faces 10a, 10b, 10c, and the like) and communicably connected to the electronic apparatus 1 wirelessly or by wire as an external accessory.

Further, in the aforementioned embodiments, the electronic apparatus 1 detects face areas with a face captured therein from captured images to detect the presence of the user, but the detection areas are not limited to the face areas, and the presence of the user may also be detected by detecting areas in which at least part of the body is captured. Further, the electronic apparatus 1 may use a distance sensor (for example, a proximity sensor or the like) together to detect distance to an object. For example, the distance sensor is provided on the inner face side of the first chassis 10 to detect an object (for example, a person) present within a detection range in a direction (forward) to face the inner face of the first chassis 10. As an example, the distance sensor may be an infrared distance sensor configured to include a light-emitting part for emitting infrared light and a light-receiving part for receiving reflected light which is the infrared light returned after being emitted and reflected on the surface of the object. Note that the distance sensor may be a sensor using infrared light emitted by a light-emitting diode, or a sensor using infrared laser emitting a light beam narrower in wavelength band than the infrared light emitted by the light-emitting diode. Further, the distance sensor is not limited to the infrared distance sensor, and it may be a sensor using any other method, such as an ultrasonic sensor or a sensor using an UWB (Ultra Wide Band) radar, as long as the sensor detects distance to the object. Further, the distance sensor does not have to be built in the electronic apparatus 1, which may also be attachable to the electronic apparatus 1 (for example, onto any of the side faces 10a, 10b, 10c, and the like) and communicably connected to the electronic apparatus 1 wirelessly or by wire as an external accessory. Further, the imaging unit 120 and the distance sensor may be integrally constructed.

Further, in the aforementioned embodiments, the example in which the person detection unit 210 is provided separately from the EC 200 is illustrated, but some or all of the functions of the person detection unit 210 may be provided in the EC 200. Further, in the aforementioned embodiments, the example in which the EC 200 includes the operation control unit 220 is illustrated, but some or all of the functions of the operation control unit 220 may be provided in any processing unit (for example, the system processing unit 300) other than the EC 200.

Further, in the aforementioned embodiments, the EC 200 operating independently of the system processing unit 300 may be any processing unit such as a sensor hub or a chipset, and the above-described processing may be executed by any processing unit other than the EC 200 instead of the EC 200.

Further, the standby state described above may also include a hibernation state, a power-off state, or the like. The hibernation state corresponds, for example, to S4 state defined in the ACPI specification. The power-off state corresponds, for example, to S5 state (shutdown state) defined in the ACPI specification. The standby state may further include a state in which at least the display of the display unit appears to be OFF (screen OFF) or a screen lock state. The screen lock is a state in which an image preset to make a processed content invisible (for example, an image for the screen lock) is displayed on the display unit, that is, an unusable state until the lock is released (for example, user authentication).

Note that the electronic apparatus 1 described above has a computer system therein. Then, a program for implementing the function of each component included in the electronic apparatus 1 described above may be recorded on a computer-readable recording medium so that the program recorded on this recording medium is read into the computer system and executed to perform processing in each component included in the electronic apparatus 1 described above. Here, the fact that "the program recorded on the recording medium is read into the computer system and executed" includes installing the program on the computer system. It is assumed that the "computer system" here includes the OS and hardware such as peripheral devices and the like. Further, the "computer system" may also include two or more computers connected through networks including the Internet, WAN, LAN, and a communication line such as a dedicated line. Further, the "computer-readable recording medium" means a storage medium such as a flexible disk, a magneto-optical disk, a ROM, a portable medium like a CD-ROM, or a hard disk incorporated in the computer system. The recording medium with the program stored thereon may be a non-transitory recording medium such as the CD-ROM.

Further, a recording medium internally or externally provided to be accessible from a delivery server for delivering the program is included as the recording medium. Note that the program may be divided into plural pieces, downloaded at different timings, respectively, and then united in each component included in the electronic apparatus 1, or delivery servers for delivering respective divided pieces of the program may be different from one another. Further, it is assumed that the "computer-readable recording medium" includes a medium on which the program is held for a given length of time, such as a volatile memory (RAM) inside a computer system as a server or a client when the program is transmitted through a network. The above-mentioned program may also be to implement some of the functions described above. Further, the program may be a so-called differential file (differential program) capable of implementing the above-described functions in combination with a program(s) already recorded in the computer system.

Further, some or all of the functions of the electronic apparatus 1 in the above-described embodiments may be realized as an integrated circuit such as LSI (Large Scale Integration). Each function may be implemented by a processor individually, or some or all of the functions may be integrated as a processor. Further, the method of circuit integration is not limited to LSI, and it may be realized by a dedicated circuit or a general-purpose processor. Further, if integrated circuit technology replacing the LSI appears with the progress of semiconductor technology, an integrated circuit according to the technology may be used.

Further, the electronic apparatus 1 in the above-described embodiments is not limited to a PC, a tablet terminal, or a smartphone, and the present invention can also be applied to a household electric appliance or a commercial electric appliance. As the household electric appliance, the present invention can be applied to a TV set, a refrigerator or a microwave oven having a display unit, or the like. For example, ON/OFF of a TV screen or ON/OFF of a screen of the display unit of the refrigerator or the microwave oven can be controlled in response to the approach or leave of a person. As the commercial electric appliance, the present invention can be applied to a vending machine, a multimedia station, or the like. For example, an operating state such as ON/OFF of lighting of the vending machine or ON/OFF of a screen of a display unit of the multimedia station can be controlled in response to the approach or leave of a person.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

DESCRIPTION OF SYMBOLS 1 electronic apparatus
10 first chassis
20 second chassis
15 hinge mechanism
110 display unit
120 imaging unit
130 acceleration sensor
140 power button
150 input device
151 keyboard
153 touch pad
200 EC
210 person detection unit
211 face detection unit
212 motion determination unit
213 person determination unit
220 operation control unit
300 system processing unit
302 CPU
304 GPU
306 memory controller
308 I/O controller
310 system memory
350 communication unit
360 storage unit
400 power supply unit

The invention claimed is:

1. An electronic apparatus comprising:
a memory which temporarily stores image data of an image captured by an imaging device; and
a processor which processes image data stored in the memory,
wherein the processor:
processes image data of a plurality of images captured by the imaging device at predetermined time intervals and stored in the memory to detect face areas with a face captured therein from among the plurality of images;
determines an amount of change in face area position detected from among the plurality of images, and determines whether or not there is motion in the captured face over the predetermined time intervals based on the amount of change;
determines that a user is present when it is determined by the processor that there is motion in the face;
determines that a user is not present when it is determined by the processor that there is no motion in the face and that the face is not a face of the user; and
registers an area of the face determined by the processor that there is no motion among faces detected respectively from the images, and excludes the registered area from determination targets after that.

2. The electronic apparatus according to claim 1, further comprising
a sensor which detects movement of the electronic apparatus,
wherein when it is detected that the electronic apparatus has been moved by using the sensor, the processor returns the registered area to a determination target.

3. The electronic apparatus according to claim 1, wherein the image data includes first-resolution image data,
the processor processes the first-resolution image data and executes a low-resolution mode to detect the face areas, and
the processor determines whether or not there is motion in the face based on the face areas detected by the processor in the low-resolution mode.

4. The electronic apparatus according to claim 3, wherein the image data includes second-resolution image data higher in resolution than the first resolution image data,
when it is detected by the processor that there is no motion in the face detected by processing the first resolution image data, the processor processes the second resolution image data and executes a high-resolution mode to detect face areas, and
the processor determines whether or not there is motion in the face based on the face areas detected by the processor in the high-resolution mode.

5. The electronic apparatus according to claim 4, wherein when the face areas are no longer detected in the high-resolution mode, the processor executes detection of face areas in the low-resolution mode.

6. The electronic apparatus according to claim 1, further comprising:
a processing unit which executes system processing based on a system; and
an operation control unit which causes an operating state of the system to make a transition to an operating state in which at least part of the system processing is limited when the electronic apparatus makes a transition from a state in which it is determined by the processor that the user is present to a state in which it is determined that the user is not present.

7. A control method for an electronic apparatus including a memory which temporarily stores image data of an image captured by an imaging device, and a processor which processes image data stored in the memory, the control method comprising:
causing the processor to process image data of a plurality of images captured by the imaging device at predetermined time intervals and stored in the memory, and detect face areas with a face captured therein from among the plurality of images;
causing the processor to determine the amount of change in face area position detected from among the plurality of images, and determine whether or not there is motion in the captured face over the predetermined time intervals based on the amount of change;
causing the processor to determine that a user is present when it is determined by the processor that there is motion in the face;
causing the processor to determine that a user is not present when it is determined by the processor that there is no motion in the face and that the face is not a face of the user; and
causing the processor to register an area of the face determined by the processor that there is no motion among faces detected respectively from the images, and excludes the registered area from determination targets after that.

8. An electronic apparatus comprising:
a memory which temporarily stores image data of an image captured by an imaging device; and
a processor which processes image data stored in the memory,
wherein the processor:
  processes image data of a plurality of images captured by the imaging device at predetermined time intervals and stored in the memory to detect face areas with a face captured therein from among the plurality of images;
  determines an amount of change in face area position detected from among the plurality of images, and determines whether or not there is motion in the captured face over the predetermined time intervals based on the amount of change; and
  determines that a user is present when it is determined by the processor that there is motion in the face, wherein
the image data includes first-resolution image data,
the processor processes the first-resolution image data and executes a low-resolution mode to detect the face areas, and
the processor determines whether or not there is motion in the face based on the face areas detected by the processor in the low-resolution mode.

9. A control method for an electronic apparatus including a memory which temporarily stores image data of an image captured by an imaging device, and a processor which processes image data stored in the memory, the control method comprising:
  causing the processor to process image data of a plurality of images captured by the imaging device at predetermined time intervals and stored in the memory, and detect face areas with a face captured therein from among the plurality of images;
  causing the processor to determine the amount of change in face area position detected from among the plurality of images, and determine whether or not there is motion in the captured face over the predetermined time intervals based on the amount of change; and
  causing the processor to determine that a user is present when it is determined by the processor that there is motion in the face, wherein
the image data includes first-resolution image data,
the processor processes the first-resolution image data and executes a low-resolution mode to detect the face areas, and
the processor determines whether or not there is motion in the face based on the face areas detected by the processor in the low-resolution mode.

* * * * *